United States Patent
Cazier et al.

(10) Patent No.: US 6,778,770 B1
(45) Date of Patent: Aug. 17, 2004

(54) CAMERA CONTROL SETTINGS WITH PERSISTENCE BASED ON ELAPSED TIME SINCE POWER-OFF

(75) Inventors: Robert P. Cazier, Fort Collins, CO (US); Michelle Ogg, Loveland, CO (US); Christopher E. Webb, Greeley, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 10/427,616

(22) Filed: Apr. 30, 2003

(51) Int. Cl.[7] .............................................. G03B 7/26
(52) U.S. Cl. ...................... 396/77; 396/129; 396/280; 348/372
(58) Field of Search ........................... 396/77, 85, 87, 396/129, 280, 301, 302; 348/372

(56) References Cited

U.S. PATENT DOCUMENTS

| | | | | |
|---|---|---|---|---|
| 5,721,989 A | * | 2/1998 | Kitazawa et al. | 396/280 |
| 5,819,120 A | * | 10/1998 | Hamada et al. | 396/77 |
| 5,848,304 A | * | 12/1998 | Ikemura | 396/77 |
| 6,184,931 B1 | * | 2/2001 | Kaneda | 348/345 |
| 6,643,458 B2 | * | 11/2003 | Sakamoto | 396/76 |

OTHER PUBLICATIONS

Amy E. Battles, Electronic Device User Interface For Selecting Persistent Settings, S/N 10/355,421, HP pending application 200209020–1, filed Jan. 31, 2003, 16 pages.

* cited by examiner

*Primary Examiner*—W. B. Perkey
(74) *Attorney, Agent, or Firm*—Augustus W. Winfield

(57) ABSTRACT

A camera, at power-on, determines elapsed time since power-off. The camera restores at least one control setting to a persistent value when the elapsed time is less than a predetermined threshold. The camera restores the at least one control setting to a default value when the elapsed time exceeds the predetermined threshold.

15 Claims, 2 Drawing Sheets

CAMERA CONTROL SETTINGS WITH PERSISTENCE BASED ON ELAPSED TIME SINCE POWER-OFF

FIELD OF INVENTION

This invention relates generally to controls for cameras.

BACKGROUND

Cameras commonly have numerous control settings. Control settings may require toggling something on or off, selection from a list, entering a numerical value or text, or other interaction. At power-on, some control settings are restored to default values determined at the time of manufacture. Some control settings may be changed from the factory defined defaults, and may be retained in non-volatile memory, so that the changed versions become the new default settings at power-on. Some control settings may be changed temporarily, and it is acceptable or desirable for them to revert back to default values when the camera is powered off. Some control settings may need to remain persistent (or semi-permanent, or "sticky").

As a example of a need for a semi-permanent control setting, a camera may include an optional control setting that places a date and time stamp visibly in the image. A photographer may prefer that the date and time stamp selection be semi-permanent, so that at power-on the camera defaults to include a date and time stamp within the image, unless the photographer resets the default. As another example, a photographer may prefer that a digital camera should always default to color mode (instead of a black and white mode) at power-on. The photographer may want to take a few black and white photographs, but may prefer for the camera to always default to color at power-on, just in case the photographer inadvertently forgets to change the control setting.

As an example of a need for a persistent control setting, in a digital camera, a caption to be printed on each photograph, or text to be stored with each photograph, may relate to an event, such as a wedding or birthday party, and the captions or text need to be persistent during the event, even if the camera is temporarily powered-off. The captions or text are not wanted or needed after the event is finished. As another example, a photographer may have a camera on a tripod, and the photographer may adjust focus, zoom, shutter speed, aperture setting, etc., and then wants to turn power off for a while to save battery life. The photographer then wants to turn camera power on and continue shooting with the previous control settings. The control settings just before power-off then need to be persistent, but not permanent.

SUMMARY

At power-on, a camera determines elapsed time since power-off. If the elapsed time is less than a predetermined threshold, then the camera uses at least one persistent control setting. If the elapsed time is greater than the predetermined threshold, then the camera uses default or semi-permanent control settings.

DETAILED DESCRIPTION

Figure 1A:
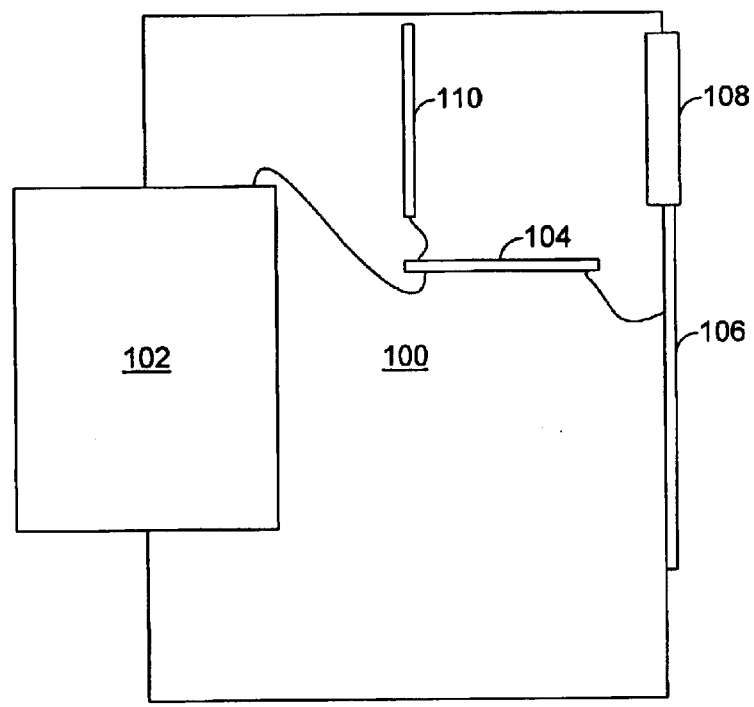
FIG. 1A is a block diagram cross section end view of an example embodiment of a camera.

In the following discussion, there are two values associated with at least one camera control setting: a "persistent value" and a "default value." A default value is semi-permanent. That is, it remains constant unless it is expressly changed by the photographer, and if it is changed, the new value becomes a new default value. Persistent values are temporary, and are replaced with default values if the camera is powered off for an extended duration. Several alternative embodiments are disclosed. For each of the embodiments, at power-on, a camera compares elapsed time since power-off to a predetermined threshold, and if the elapsed time is less than the threshold, the camera restores a persistent value for at least one control setting. If the elapsed time is greater than the threshold, all control settings are restored to their default values.

For digital cameras, control settings may include, for example, date and time, focus modes (manual focus or auto-focus), auto-exposure options (spot, average, or center weighted), shutter and aperture settings, focal distance, zoom, illumination source (daylight, incandescent, fluorescent), resolution, color or black/white, date and time stamp, text for captions, sound level, still mode or moving picture mode or burst mode, flash mode on or off, self timer, compression level, file type, I/O connection mode, etc. Some control settings may be grouped into classes. For example, auto-exposure options may be a class of control settings with three optional control settings within the class.

It may be preferable for a camera to save every control setting value at power-off, and to restore all those control setting values at power-on. Accordingly, in one embodiment, at power-on, the camera restores all control settings to values that were in effect at power-off. That is, all control setting values are persistent. Alternatively, there may need to be some exceptions. For example, if a camera is in a self-timer mode or burst mode at power-off, the photographer may not want the camera to be in self-timer mode or burst mode on power-on. In a second embodiment, the photographer can designate some control settings, or classes of control settings, to be exceptions. In the second embodiment, at power-on, the camera restores all control setting values that were in effect at power-off, except designated exceptions. That is, in the second embodiment, all control settings are persistent unless designated as an exception. In a third embodiment, the photographer designates individual control settings, or classes of control settings, that are to be persistent, and at power-on only designated persistent control setting values are restored, and default settings are used for the remaining control settings. That is, in the third embodiment, all control setting values are the default values after power-off, unless designated persistent. In the second and third embodiments, some variable control settings are preferably automatically designated as semi-permanent, so that once changed, the new values become the new default values. For example, date and time may be a control setting that can be changed by the photographer, but preferably should not be restored to the original default values from the time of manufacturing regardless of the duration of power-off.

FIG. 1A illustrates an example camera 100. The camera includes an a lens system 102, which optionally may be capable of zoom and automatic focus. For a zoom lens, the lens may be retracted at power-off. Zoom position and focal distance are control settings that may be persistent. The camera includes a controller assembly 104, which in turn includes a processor or processor equivalent. The controller assembly may include non-volatile memory for storing control settings and time, or non-volatile memory may reside elsewhere in the camera. The camera optionally may have an external display 106. The camera optionally may have an optical viewfinder 108, and optionally may have an internal display 110 visible through the viewfinder. Selection of some control settings may be made using an external display (e.g., 106), or an internal display (e.g., 110), or both. Some control settings may be made automatically. Some control setting values may not be displayed. For example, lens zoom position and focal distance may or may not be displayed.

The camera 100 has a way to determine elapsed time, for example by reading a timer, or by reading an internal date and time and subtracting a previously stored date and time, or by reading an external date and time and subtracting a previously stored date and time. If elapsed time is determined internally, the controller assembly may include an elapsed time counter, or may include date and time circuitry. An external date and time may be read, for example, by using a wireless network.

Figure 1B:
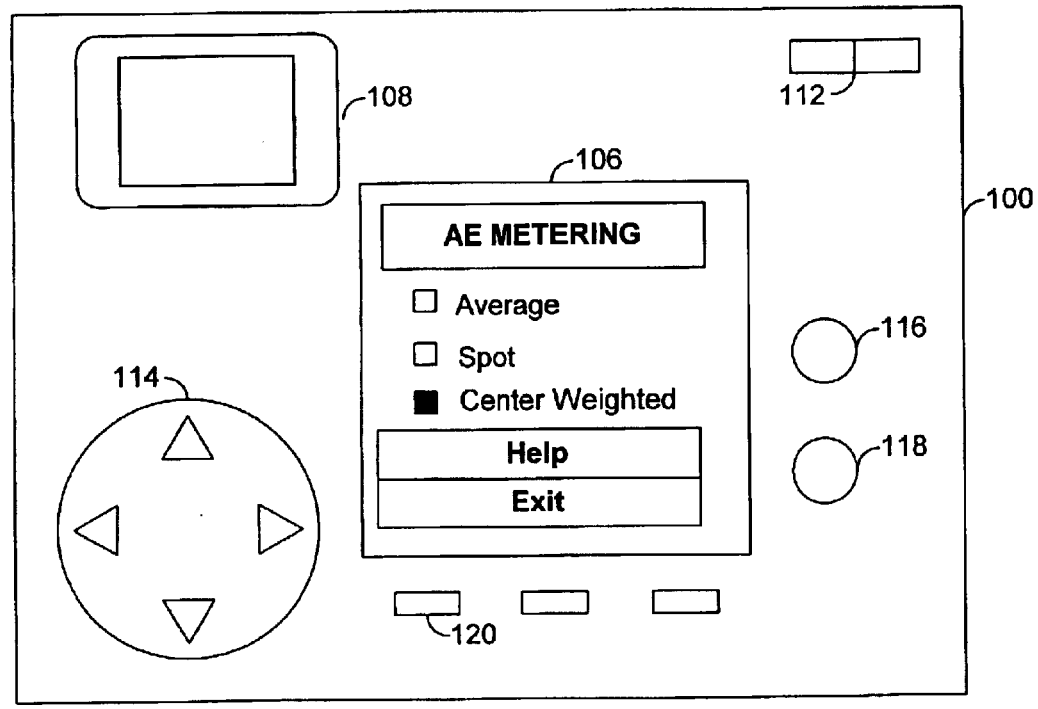
FIG. 1B is a block diagram of the rear of the camera of FIG. 1A.

FIG. 1B illustrates the back of the camera illustrated in FIG. 1A, further illustrating an example of control settings being selected using an external display. The camera includes an on/off switch 112. The on/off switch may physically switch power, or the switch state may be detected by the processor, which in turn may control power. When camera power is switched off, the camera will go into a low power mode, but some circuitry such as date and time circuitry, and circuitry to detect the state of the power switch, may remain active. A four-way rocker switch 114 is an example of a switch that can be used for directional control in navigating menu choices. A switch 116 turns the external display 106 on and off. A switch 118 is used to step through a series of menu headers for control settings. A switch 120 is used to activate a selected control setting menu item. In figure 1B, switch 118 has been used to display a menu for autoexposure metering. Rocker switch 114 has been used to highlight an option for Center Weighted autoexposure. Switch 120 may be used to activate the highlighted Center Weighted autoexposure.

The camera may have a factory designated elapsed time threshold that is non-variable. Alternatively, the elapsed time threshold may be a control setting that can be adjusted by the photographer. The elapsed time threshold may optionally be designated as semi-permanent.

Figure 2:
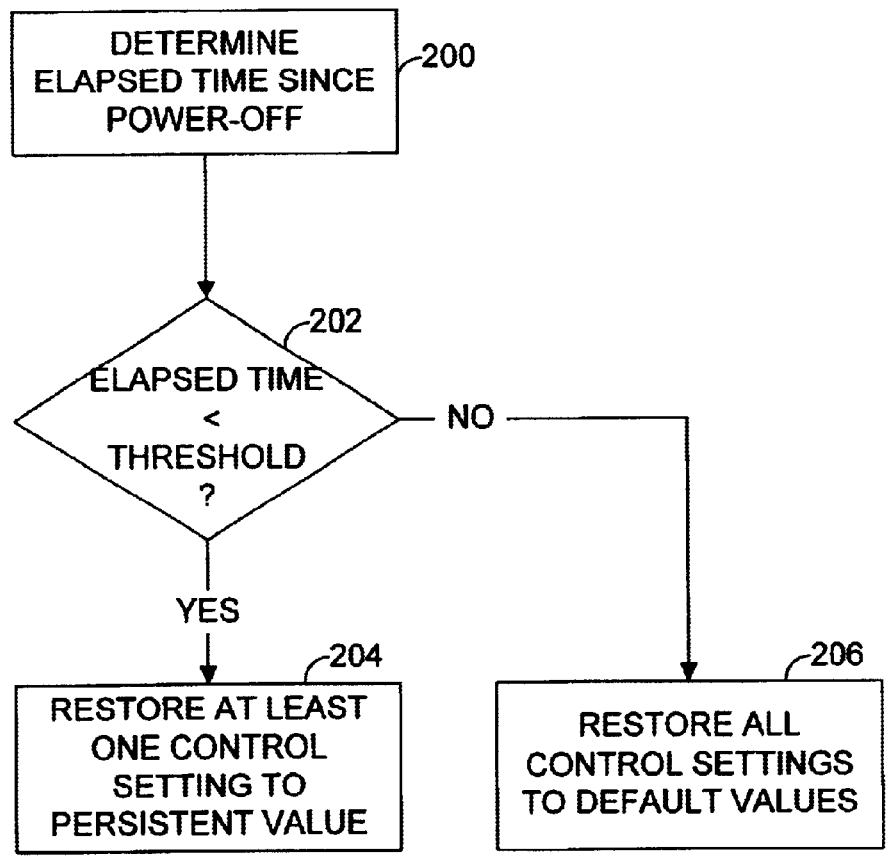
FIG. 2 is a flow chart of an example embodiment of a method.

FIG. 2 illustrates an example embodiment of a method. At step 200, a camera determines elapsed time since power-off. At decision 202, elapsed time is compared to a predetermined threshold. If the elapsed time is less than the predetermined threshold, then at step 204 at least one control setting is restored to a persistent value. Otherwise, at step 206 all control settings are restored to default values.

What is claimed is:

1. A method, comprising:
   determining, in a camera, at power-on, elapsed time since power-off;
   restoring at least one control setting to a persistent value when the elapsed time is less than a predetermined threshold; and,
   restoring the at least one control setting to a default value when the elapsed time is greater than the predetermined threshold.

2. The method of claim 1, further comprising:
   designating all control settings as persistent.

3. The method of claim 1, further comprising:
   designating all control settings as persistent unless expressly designated as default.

4. The method of claim 1, further comprising:
   designating all control settings as default unless expressly designated as persistent.

5. The method of claim 1, further comprising:
   designating lens zoom position as a persistent value.

6. The method of claim 1, further comprising:
   designating lens focal distance as a persistent value.

7. The method of claim 1, further comprising:
   determining elapsed time by reading a time at power-on, and subtracting a time stored at power-off.

8. The method of claim 7, further comprising:
   reading an internal time.

9. The method of claim 7, further comprising;
   reading an external time.

10. The method of claim 1, where the predetermined threshold is variable.

11. A method, comprising:
    determining, in a camera, at power-on, elapsed time since power-off;
    designating at least one class of control settings so that default setting values for the at least one class of control settings are restored at power-on; and
    restoring control settings that are not in the at least one class of control settings to values that were in effect at power-off when the elapsed time is less than a predetermined threshold.

12. A method, comprising:
    determining, in a camera, at power-on, elapsed time since power-off;
    restoring all control settings to values that were in effect at power-off, when the elapsed time is less than a predetermined threshold; and
    restoring all control settings to default values when the elapsed time exceeds the predetermined threshold.

13. A method, comprising:
    determining, in a camera, at power-on, elapsed time since power-off;
    restoring a predetermined set of control settings to persistent values, when the elapsed time is less than a predetermined threshold; and
    restoring all control settings to default values when the elapsed time exceeds the predetermined threshold.

14. A camera, comprising:
    a controller assembly, the controller assembly determining, at power-on, time duration since power-off; and
    when the time duration is less than a predetermined threshold, the controller assembly restores at least one camera control setting to a value, in existence at power-off, that is different than a default value; and
    when the elapsed time is greater than the predetermined threshold, the controller assembly restores the at least one camera control setting to the default value.

15. A camera, comprising:
    means for determining, at power-on, elapsed time since power-off;
    means for restoring a control setting to a persistent value when the elapsed time is less than a predetermined threshold; and
    means for restoring the control setting to a default value when the elapsed time is greater than the predetermined threshold.

* * * * *